(12) United States Patent
Ortmann et al.

(10) Patent No.: US 6,171,211 B1
(45) Date of Patent: Jan. 9, 2001

(54) AUTOMATIC TRANSMISSION CONTROL SYSTEM HAVING A NEUTRAL IDLE FEATURE

(75) Inventors: Walter Joseph Ortmann, Ypsilanti, MI (US); Todd Curtis Spaulding, Virginia Beach, VA (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/410,918

(22) Filed: Oct. 1, 1999

(51) Int. Cl.$^7$ .................................................. F16H 59/70
(52) U.S. Cl. .............................. 477/62; 477/158; 477/162
(58) Field of Search .................... 477/62, 65, 70, 477/79, 158, 162, 163

(56) References Cited

U.S. PATENT DOCUMENTS

| | | | |
|---|---|---|---|
| 4,843,920 | * 7/1989 | Hayasaki et al. | 477/62 |
| 4,938,097 | 7/1990 | Pierce | 475/72 |
| 5,272,630 | 12/1993 | Brown et al. | 701/68 |
| 5,389,046 | 2/1995 | Timte et al. | 475/127 |
| 5,637,053 | * 6/1997 | Droste et al. | 477/62 |
| 5,865,704 | * 2/1999 | Takagi et al. | 477/62 |

* cited by examiner

Primary Examiner—Sherry Estremsky
(74) Attorney, Agent, or Firm—Frank G. McKenzie (57) ABSTRACT

An electronically controlled automatic transmission hydraulic valve system for an automotive vehicle transmission having multiple forward-drive ratios and a reverse ratio. Clutch and brake means controls motion of gearing elements for establishing forward torque flow paths and a reverse torque flow path, the clutch and brake means including a reverse drive clutch and a forward drive clutch. Each clutch, when engaged, completes a torque flow path from a vehicle engine to torque input elements of the gearing. The forward clutch and reverse clutch each includes friction elements that are frictionally engaged by a pressure-actuated piston. Regulated pressure strokes each piston. An engagement valve system triggers normal forward clutch and reverse clutch operation during torque delivery and for establishing a neutral idle capability in both forward and reverse.

8 Claims, 6 Drawing Sheets

Fig. 1

| GEAR | RC | CC | FC | DC | L/R | 2/4 | OWC2 DR | OWC2 CO | OWC1 DR | OWC1 CO | RATIO | COAST BRAKING |
|------|----|----|----|----|-----|-----|---------|---------|---------|---------|-------|---------------|
| M-1  |    | X  | X  |    | X   |     | X       | -       | X       | -       | 2.889 | YES |
| M-2  |    | X  | X  |    |     | X   | X       | -       | OR      | OR      | 1.571 | YES |
| M-3  |    | X  | X  | X  |     |     | X       | -       | OR      | OR      | 1.000 | YES |
| 1st  |    |    | X  |    |     |     | X       | OR      | X       | OR      | 2.889 | NO  |
| 2nd  |    |    | X  |    |     | X   | X       | OR      | OR      | OR      | 1.571 | NO  |
| 3rd  |    |    | X  | X  |     |     | X       | OR      | OR      | OR      | 1.000 | NO  |
| 4th  |    |    |    | X  |     | X   | OR      | OR      | OR      | OR      | .689  | YES |
| REV  | X  |    |    |    | X   |     | -       | -       | -       | -       | 2.310 | YES |

AUTOMATIC TRANSMISSION CONTROL SYSTEM HAVING A NEUTRAL IDLE FEATURE

TECHNICAL FIELD

The invention relates to automatic transmissions for automotive vehicles including a hydrokinetic torque converter.

BACKGROUND OF THE INVENTION

An electronically controlled automatic transmission for automotive vehicles has clutches and brakes for establishing and disestablishing torque flow paths through multiple-ratio gearing from a vehicle engine to vehicle traction wheels. A hydrokinetic torque converter is disposed between the engine and torque input elements of the gearing. The neutral idle control system of the invention is particularly adapted to be used in an automatic transmission control system of the kind disclosed, for example, in U.S. Pat. No. 5,389,046. A multiple-ratio gearing system for the transmission of the '046 patent is disclosed in U.S. Pat. No. 4,938,097.

Automatic transmissions having a torque converter and multiple-ratio planetary gearing, such as the transmissions disclosed in the '046 and '097 patents, do not have the ability to provide a neutral idle since the forward and reverse clutches are applied with line pressure. With the engine throttle closed, the line pressure for the control valve system is reduced, but the minimum value is relatively high (e.g., 50 psi). The forward drive clutch or the reverse clutch thus is fully engaged when the engine throttle is closed as the torque converter continues to deliver torque.

Attempts have been made to improve the driveline efficiency by unloading the converter when the engine is idling and the vehicle is at rest. Such control valve systems make it possible to reduce undesirable noise vibration and harshness in the driveline when the engine is idling and the automatic transmission is in a drive mode. U.S. Pat. No. 5,272,630 is an example of an attempt to avoid the noise vibration and harshness problem.

The '630 patent describes a control strategy for supplying a residual or threshold pressure to the fluid pressure actuators for the clutches at the beginning of the acceleration mode using an electronic, closed-loop controller. The actuators can be fully stroked at the instant the acceleration mode begins. The closed-loop controller compensates for changes in driveline variables such as changes in oil temperature and clutch spring forces, for example, so that each clutch engagement is repeatable.

The control system of the '046 patent, unlike the control system for the '630 patent, lacks the ability to provide neutral idle since the forward and reverse clutches are applied with a minimum value that is relatively high at the initiation of the acceleration mode. For that reason, the clutches remain applied when the engine idles and the vehicle is at rest.

The neutral idle feature described in the '630 patent requires the addition of extra solenoids, pressure accumulators, and extra valve elements in the control system, which adds complexity and manufacturing cost to the transmission compared to the control system of the '046 patent.

U.S. Pat. Nos. 4,938,097, 5,272,630 and 5,389,046 are owned by the assignee of the present invention.

BRIEF DESCRIPTION OF THE INVENTION

The improved control system of the present invention provides a neutral idle capability in both forward and reverse drive ranges without the addition of costly and complex solenoid valves, accumulators, and associated fluid circuitry. This is done by controlling the forward drive clutch or the reverse drive clutch so that the clutches will slip to emulate a neutral state. This slipping clutch mode requires the fluid pressure piston actuators for the clutches to be fully stroked to effect an immediate torque delivery state when the driver demands torque at the initiation of the acceleration mode of the vehicle. The neutral idle feature is achieved in the improved transmission system of the invention by providing only one additional valve and a slight modification to a shift valve element that controls ratio changes between the lowest ratio and an intermediate ratio.

The transmission that embodies the present invention, like the transmissions disclosed in the '097 patent, the '046 patent and the '630 patent, includes a pressure-operated torque converter bypass clutch, which is applied when the transmission operates in the low-gear ratio at the beginning of the acceleration mode. A main pressure regulator valve supplies regulated line pressure to the valve system. Line pressure is modulated in both forward and reverse drive. An engagement valve controls modulated line pressure distribution to a forward clutch or a low-and-reverse brake when the transmission is in the normal operating mode as well as when the transmission is in the neutral idle mode.

A torque converter bypass clutch for the transmission of the invention can be applied so that the hydrokinetic torque flow path through the converter is replaced with a mechanical torque flow path through the friction elements of the bypass clutch. The invention includes a means for multiplexing a bypass clutch control solenoid for the bypass clutch so that it is capable of acting as an actuator for the engagement valve to achieve a neutral idle condition when the transmission is in a neutral idle mode and for controlling the bypass clutch when the transmission is in the normal operating mode.

The pressure made available to each clutch (i.e., the forward clutch or the low-and-reverse brake) is controlled by a pressure regulator valve that responds to an electronic line pressure control solenoid. The electronic line pressure control solenoid is capable of establishing line pressure regulation and clutch and brake servo pressure during operation of the transmission in its normal operating mode, but it is capable also of functioning as one element of a forward clutch and low-and-reverse brake controller in conjunction with a pressure regulator valve when the transmission is in the neutral idle mode. The multiple functions achieved by the bypass clutch control solenoid and by the electronic line pressure control solenoid eliminate the requirement for additional valves and separate dedicated pressure controllers for the forward clutch and the low-and-reverse brake during neutral idle operation.

The present invention also eliminates the need for forward clutch and low-and-reverse brake accumulators normally used in the transmission disclosed in the '046 patent. The functions of the accumulators are provided instead by the electronic line pressure solenoid, which is used for forward clutch and low-and-reverse brake pressure regulation during the neutral idle operating mode. The removal of the low-and-reverse accumulator further simplifies the control system.

PARTICULAR DESCRIPTION OF THE INVENTION

Figure 1:
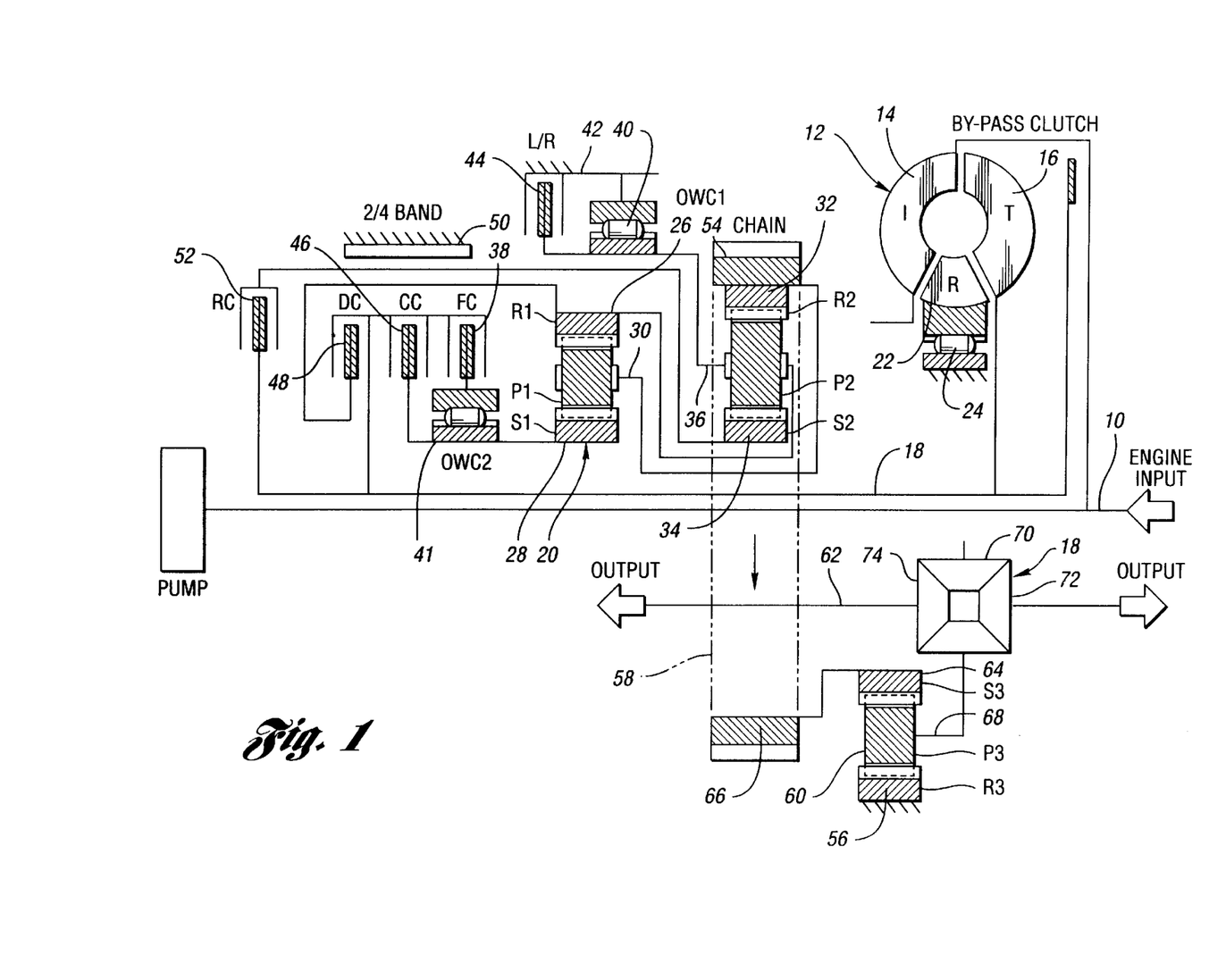
FIG. 1 is a schematic representation of a hydrokinetic torque converter and gearing elements for a transmission capable of embodying the invention.

FIG. 1 shows in schematic form a torque converter and gearing arrangement for a transmission of the type disclosed in U.S. Pat. No. 4,938,097. In FIG. 1, numeral 10 designates a torque input shaft, which may be connected to the crankshaft of an internal combustion engine for an automotive vehicle. A hydrokinetic torque converter 12 includes an impeller 14 connected drivably to the input shaft 10.

A turbine 16 of the torque converter 12 is connected to a torque input shaft 18 for multiple-ratio gearing 20.

A bladed reactor or stator 22 is situated at the flow exit side of the turbine and the flow entrance side of the impeller. It is mounted on an overrunning brake 24 to provide a hydrokinetic torque reaction, which results in a hydrokinetic torque multiplication in well known fashion when the torque converter is in a hydrokinetic torque multiplication mode as the engine torque is multiplied by the torque ratio of the converter to produce a higher turbine shaft torque.

The gearing 20 comprises a pair of simple planetary gear units. The first gear unit includes a ring gear 26, a sun gear 28 and planetary pinions supported on a planetary carrier 30. The gearing 20 includes also a second simple planetary gear unit that includes ring gear 32, sun gear 34, and planetary pinions journalled on carrier 36.

Torque is delivered from the turbine shaft 18 through forward clutch 38 and through overrunning coupling 41 to the sun gear 28 of the first planetary gear unit 20. The carrier 36 of the second planetary gear unit serves as a reaction member since it is braked by overrunning brake 40 during operation in the lowest forward-driving speed ratio. Brake 40 distributes reaction torque to the transmission casing 42. A friction brake 44 is arranged in parallel relationship with respect to the overrunning brake 40 to effect torque transfer to the casing in either direction. This brake accommodates coast braking during operation in the lowest forward-driving ratio. A coast clutch 46 is arranged in parallel relationship with respect to overrunning brake 41 and accommodates torque transfer in either direction between the turbine shaft 18 and the sun gear 28.

Direct clutch 48, when it is engaged, connects turbine shaft 18 to ring gear 26. Forward clutch 38 and direct-drive clutch 48 are engaged simultaneously to effect direct-drive ratio in the gearing. Clutches 38 and 48 are engaged also simultaneously with friction brake band 50 during operation of the transmission in the fourth driving ratio, which is an overdrive ratio. Friction brake band 50 anchors sun gear 34 to provide a reaction point for the gearing during overdrive operation.

A reverse clutch 52 connects the turbine shaft 18 to the sun gear 34 of the second planetary gear unit during reverse drive. Friction brake 44 also is applied during reverse drive. The sun gear 34 thus acts as a torque input gear element with the carrier 36 anchored. The ring gear 32 is driven in the reverse direction.

The ring gear 32 acts as a torque output element during forward drive as well as reverse drive. It is connected directly to a chain sprocket 54. Output sprocket 56 is connected to the sprocket 54 by drive chain 58.

A final drive gear unit 60 is arranged on torque output axis 62. Sprocket 56 is connected directly to sun gear 64 of final drive gear unit 60. Ring gear 66 of the gear unit 60 is connected to the transmission case. Carrier 68 rotatably supports planetary pinions for the final drive gear unit 60. Carrier 68 drives a differential carrier housing, which rotatably supports differential pinions 70. Each pinion 70 engages a separate side gear as shown at 72 and 74. Torque output shafts extending to axle half shafts of traction wheels of the vehicle are connected to the side gears 72 and 74 in known fashion.

Figure 1A:
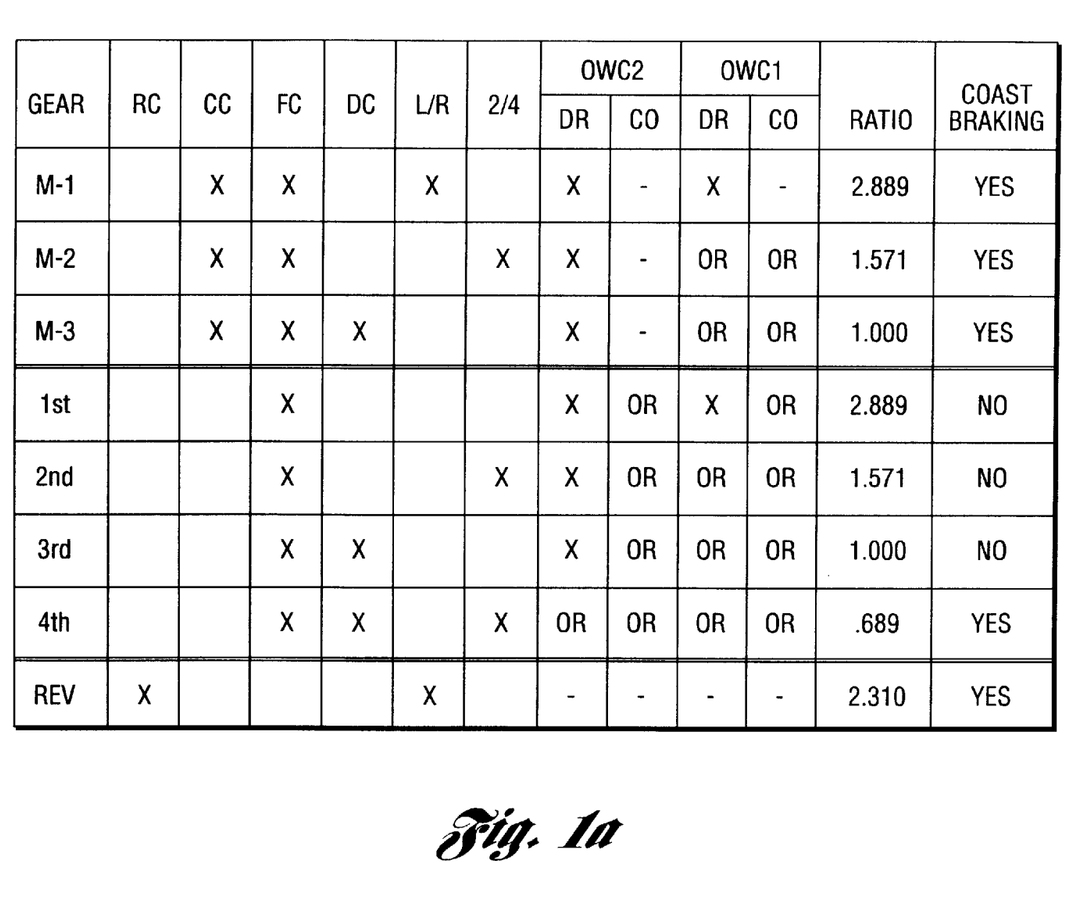
FIG. 1*a* is a chart showing the clutch and brake engagement and release pattern for the transmission of FIG. 1 as the forward driving ratios and the reverse ratio are established and disestablished.

FIG. 1*a* shows the engagement and release pattern for the clutches and brakes illustrated schematically in FIG. 1. Reverse clutch 52 is identified in FIG. 1*a* by the symbol RC. The direct clutch 48 is identified by the symbol DC. The coast clutch 46 is identified by the symbol CC. The forward clutch 38 is identified by the symbol FC. The low-and-reverse brake 44 is identified by the symbol L/R. The friction brake band 50 is identified by the symbol 2/4. Overrunning coupling 40 is identified by the symbol OWC1, and overrunning clutch 41 is identified by the symbol OWC2.

FIG. 1*a* shows the clutches and brakes that are applied to achieve each of the forward-driving ratios and the reverse ratio. The symbol OR is used to designate an overrunning coupling, and the symbol X is used to indicate an applied clutch or brake.

Figure 2:
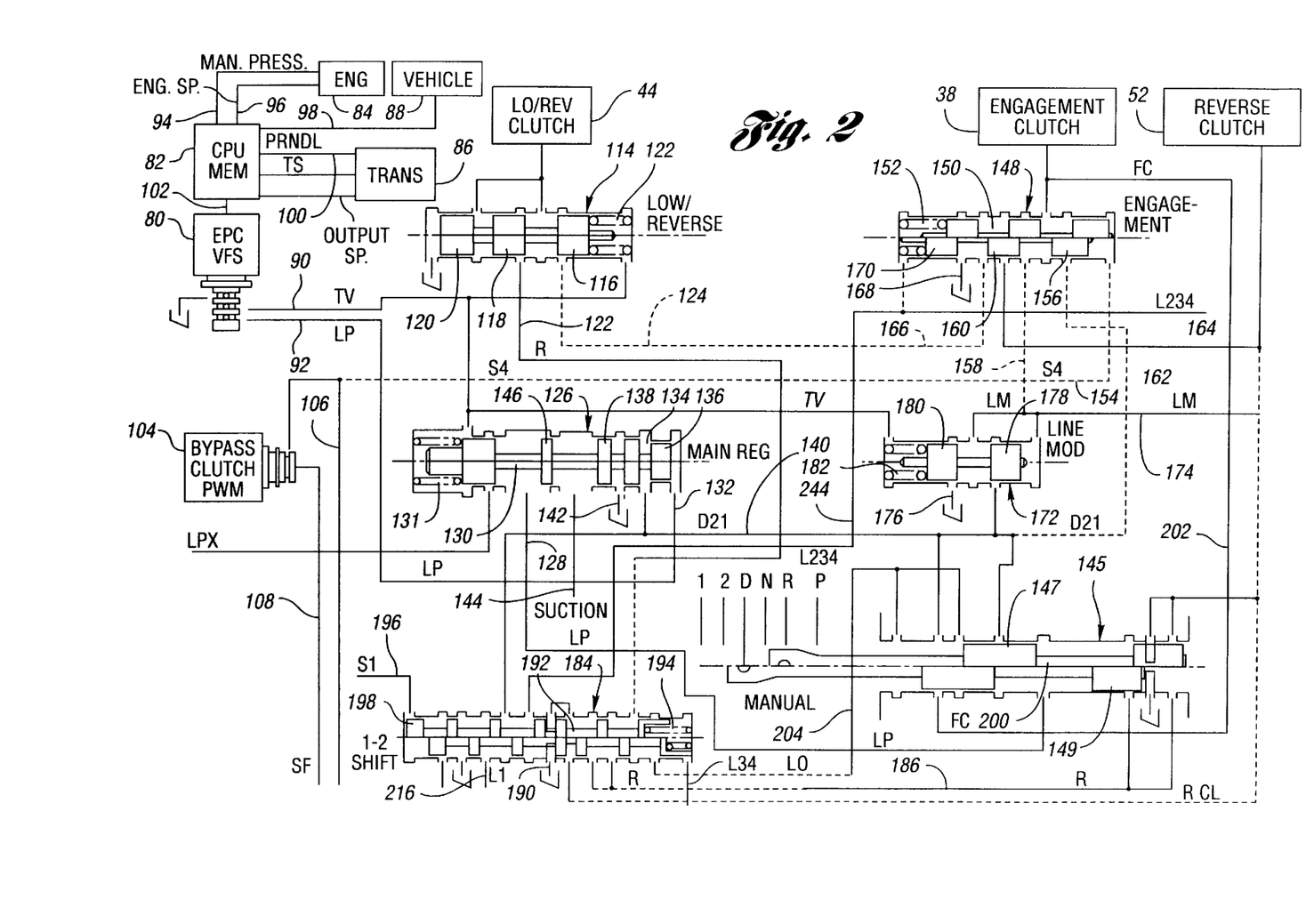
FIG. 2 is a schematic diagram of a portion of the control valve system for controlling the gearing elements of FIG. 1.

FIG. 2 shows a portion of the control valve circuit that controls the application and release of the clutches and brakes of the transmission of FIG. 1. For a description of the complete control valve circuit, reference may be made to the previously discussed U.S. Pat. No. 5,389,046. The disclosure of that patent and the disclosures of the previously discussed U.S. Pat. Nos. 5,272,630 and 4,938,097 are incorporated herein by reference.

As seen in FIG. 2, an electronic pressure control variable-force solenoid 80 responds to control signals from a driveline microprocessor controller 82. Input signals from the engine 84 and from the transmission 86, as well as driveline control signals of the vehicle 88 (i.e., a brake signal, a speed signal, etc.), activate solenoid valve 80 to develop a throttle valve pressure output in line 90. Line pressure is distributed to the variable-force solenoid 80 through line pressure passage 92.

The signals from the engine include a manifold pressure signal in signal flow path 94 and an engine speed signal in signal flow path 96. The vehicle signal may include a brake signal delivered to the microprocessor 82 through signal flow path 98. The signals from the transmission include a manual valve position signal selected by the vehicle operator, which is transferred to the controller 82 through signal flow path 100.

The microprocessor 82 includes a central processor unit (CPU), which receives the input data and, using control algorithm stored in memory, creates an appropriate output signal in signal flow path 102, which controls variable-force solenoid 80.

Figure 2A:
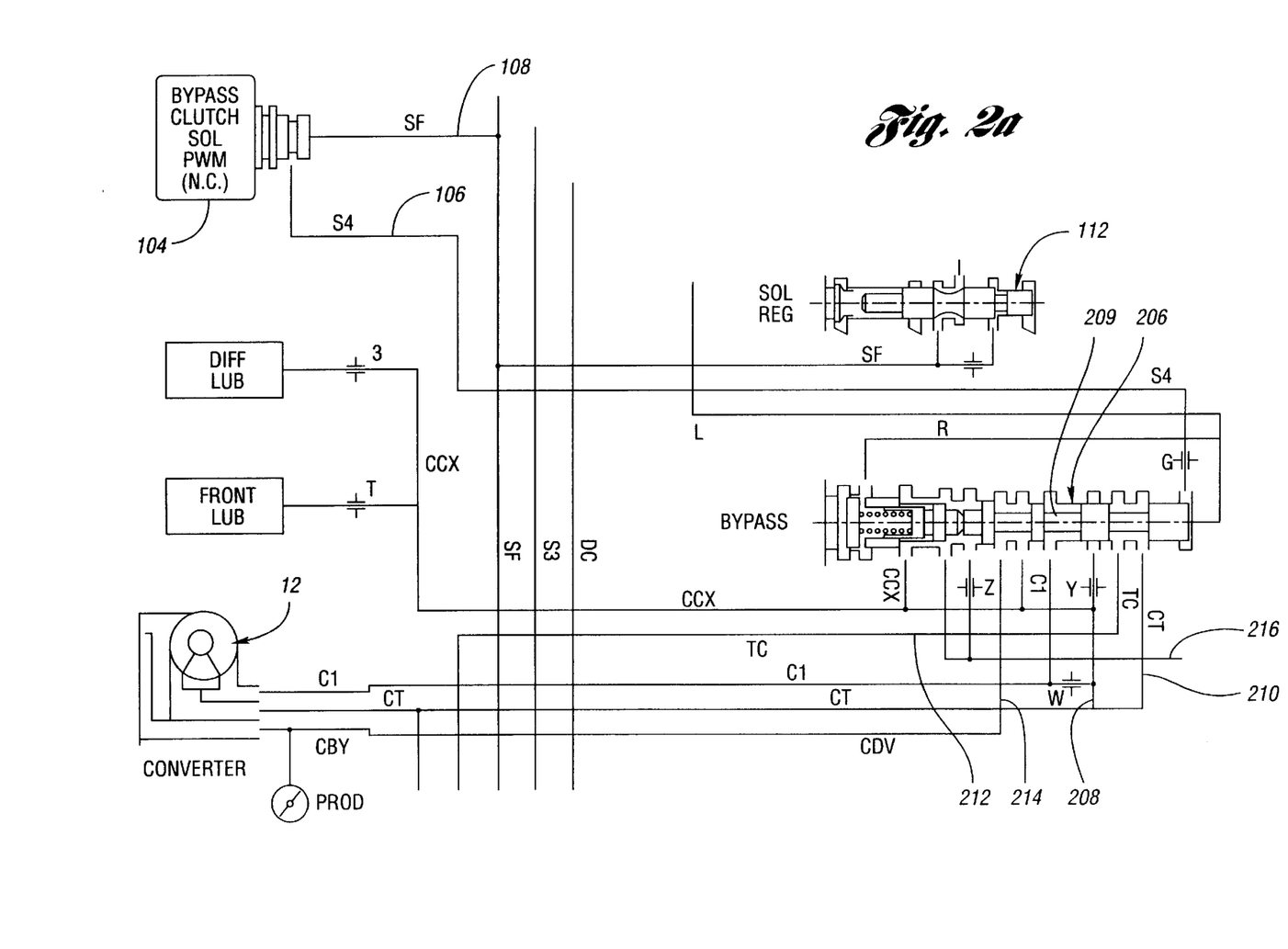
FIG. 2*a* is a schematic representation of the portion of the control valve system that effects control of the bypass clutch for the torque converter illustrated in FIG. 1.

A bypass clutch pulse width modulated solenoid 104 establishes a bypass clutch pressure signal in passage 106, which extends to a bypass clutch control valve 108 seen in FIG. 2a. The bypass clutch solenoid 104 is supplied with pressure from the solenoid feed passage 108, which is supplied with an appropriate pressure by solenoid regulator valve 112, as seen in FIG. 2a.

A low-and-reverse pressure regulator valve 114, as seen in FIG. 2, regulates the pressure in the clutch 44. It comprises a multiple land valve spool having valve lands 116, 118 and 120. It is urged in a left-hand direction by valve spring 122. The diameter of land 120 is less than the diameter of land 118, creating a differential area that is subjected to low-and-reverse clutch pressure as line pressure is distributed to the valve 114 through line pressure passage 122. Low-and-reverse clutch vent passage 124 communicates with the valve 114.

A main regulator valve 126 is supplied with line pressure through passage 128. Regulator valve 126 includes a valve spool 130, which is urged in the right-hand direction by valve spring 131. Pressure feedback for the regulator valve 126 is supplied by feedback passage 132, which acts on the spool valve to oppose the force of spring 131. Valve lands 134 and 136 define a differential area that is subjected to line pressure in passage 140 when the manual valve is in position 1, position 2 or position D. Valve land 138 on the regulator valve 126, as well as lands 134 and 146, controls communication between the exhaust port 142 and the valve chamber for regulator valve 126.

Manual valve 145 includes a manually adjustable valve spool having valve lands 147 and 149. Suction line 144 between lands 138 and 146 communicates with the intake side of a positive displacement transmission pump (not illustrated). Line pressure from the outlet side of the pump is distributed through passage 128 from the manual valve, as explained previously.

A two-position engagement valve 148 controls the operation of forward clutch 38 and low-and-reverse clutch 44 during both the normal operating mode and the neutral idle operating mode. The engagement valve comprises a multiple land valve spool 150. It is shown in each of its operating positions. The right-hand position is the normal position, and the left-hand position is the neutral idle position. Valve spool 150 is urged toward the normal position by valve spring 152. A signal pressure in passage 154, which is the output pressure passage for the bypass clutch solenoid 104, communicates with the right-hand side of valve land 156 whereby the valve spool 150 is shifted in the left-hand direction against the force of the spring 152. When the engagement valve assumes the left-hand position, modulated line pressure in passage 158 is distributed through the engagement valve between lands 156 and 160 to the forward clutch 38. When the valve spool 150 is shifted in the right-hand direction, line pressure in passage 162 is distributed to the forward clutch.

Modulated line pressure in passage 158 is developed by line pressure modulator valve 172. This valve is a simple regulator valve, which receives line pressure from passage 140 and delivers a modulated line pressure to passage 174. Passage 174 communicates with passage 158.

The exhaust passage for the line pressure modulator valve 172 is shown at 176. Communication between passage 140 and line pressure modulator passage 174 is effected by line pressure modulator valve lands 178 and 180. Valve spring 182 opposes the modulated line pressure feedback force acting on the right-hand side of land 178.

A 1-2 shift valve 184 controls distribution of reverse clutch pressure from passage 186 to passage 122 during operation of the transmission in the normal reverse drive mode, and pressure in the reverse clutch 52 is vented through passage 188 and through vent port 190 when the shift valve is in the second ratio position, which is the left-hand position as viewed in FIG. 2.

Valve 184 comprises a valve spool 192, which is urged normally in a left-hand direction by valve spring 194. A shift signal in passage 196 acts on the left-hand land 198 of valve spool 192, thereby shifting the valve spool 192 in a right-hand position, which is the first ratio position.

The manual valve 144 includes shiftable valve spool 200, which is moved by the vehicle operator to any of the positions indicated in FIG. 2. These positions are identified by the symbols 1, 2, D, N, R and P which, respectively, indicate the manual first ratio position, the manual second ratio position, the automatic forward drive position, the neutral position, the reverse position and the park position.

Regulated line pressure is distributed to the manual valve through passage 128. The manual valve pressurizes passage 140 when it is in the D position, the 2 position or the 1 position. It vents passage 202 when it is in the reverse position. Passage 202 extends directly to the forward clutch 38. Passage 204, which extends to the 1-2 shift valve, is vented through the manual valve when the manual valve is in the R position.

FIG. 2a shows the bypass clutch controller for engaging and releasing the bypass clutch. The controller includes a bypass control valve 206, which receives regulated converter clutch pressure in passage 208. The pressure in passage 208 is controlled by a converter pressure regulator (not shown). When the bypass clutch is in the "OFF" position, as shown in FIG. 2a, passage 210 extending to the converter turbine communicates with the torque converter cooler circuit as shown in part at 212, which is a low-pressure circuit. Further, passage 214, which communicates with the release side of the torque converter clutch, is pressurized as it communicates with passage 208. Passage 214, when the valve spool 210 is moved in the left-hand direction, is not pressurized by the passage 208, thereby allowing the converter clutch to engage.

Shifting movement of the valve spool 209 is controlled by bypass clutch solenoid pressure in passage 106. The bypass clutch solenoid is fed with solenoid regulated pressure from valve 112, which is a simple regulator valve with a constant regulated circuit pressure level.

When the 1-2 shift valve is in the first ratio position, line pressure passage 216, as seen in FIG. 2 as well as in FIG. 2a, is pressurized. This disables the bypass valve by forcing it under the pressure in passage 216 to its "OFF" position, which is the right-hand position seen in FIG. 2a. Thus, the bypass clutch cannot be activated when the transmission is operating in the lowest ratio.

For purposes of explaining the mode of operation of the invention and to distinguish it from the prior art, reference now will be made to FIGS. 3, 3a, 4 and 4a.

Figure 3:
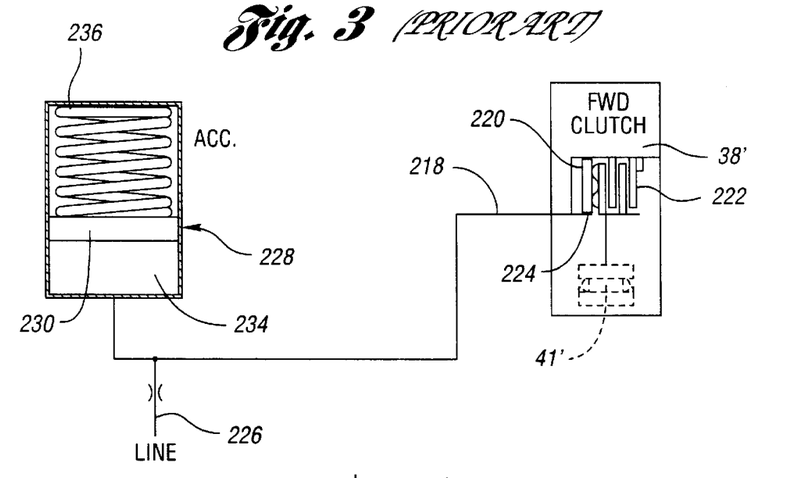
FIG. 3 is a schematic representation of a known hydraulic sub-circuit for controlling the engagement of a forward clutch for a transmission of the kind illustrated in FIG. 1.
Figure 3A:
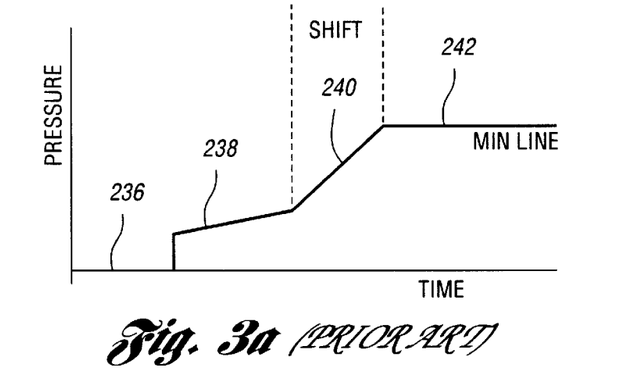
FIG. 3*a* is a plot of the pressure buildup in the forward clutch during the clutch engagement interval for a known transmission of the kind illustrated in FIG. 1.

FIG. 3a is a typical automatic transmission forward clutch engagement for a gearing arrangement of the kind shown, for example, in FIG. 1. Pressure is distributed to the clutch through line 218. The clutch is indicated in FIG. 3 by reference numeral 38'. The clutch typically includes a clutch piston 220, which acts on a friction disc clutch pack 222 with a cushion spring, such as a wave spring located between the piston and the clutch discs as shown at 224.

Passage 218 is supplied with pressure from line pressure passage 226. An accumulator 228 is located in the clutch bypass passage 218. The accumulator typically includes an accumulator piston 230 and an accumulator spring 232. The spring is compressed as pressure builds up in the accumulator chamber 234.

For an arrangement of the kind shown in FIG. 3, the pressure versus time engagement characteristic is similar to that shown in FIG. 3a, where the engagement time is plotted on the abscissa and the pressure in the clutch chamber is plotted on the ordinate. When engagement begins, the clutch piston is stroked initially during time interval 236. The pressure begins to increase, as shown at 238, when the compression spring 224 is engaged. As the spring compresses, the pressure gradually increases. The engagement actually occurs when the friction discs frictionally engage as the pressure rises at a greater slope, as shown at 240. The final engagement pressure, upon completion of the engagement, is indicated at 242.

Figure 4:
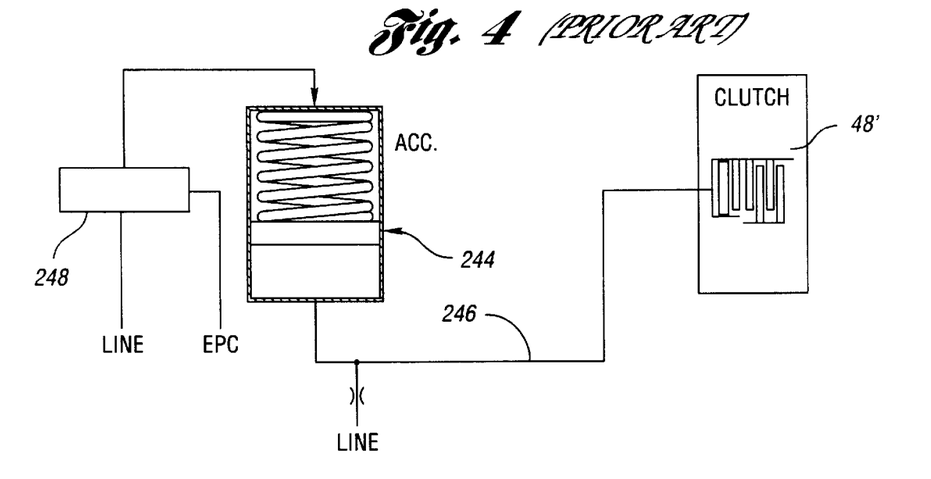
FIG. 4 is a schematic representation of a known hydraulic valve system illustrating a sub-circuit for controlling clutch engagement during an upshift of a transmission of the type illustrated in FIG. 1.
Figure 4A:
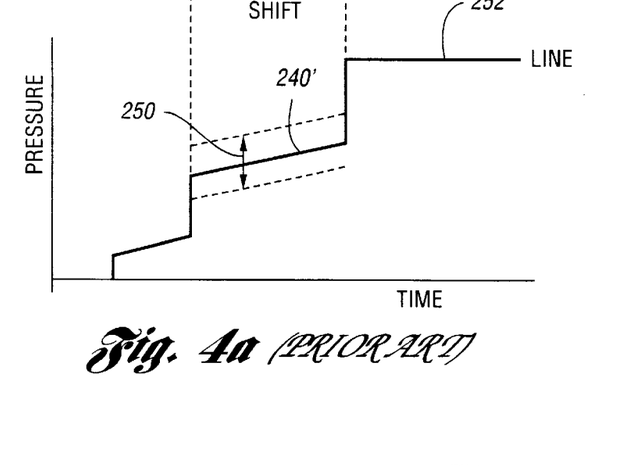
FIG. 4*a* is a plot of the pressure buildup in the clutch that is applied during an upshift versus the engagement time.

If the engaging clutch is a clutch that effects a ratio change, the engagement characteristic would be similar to that shown in FIG. 4a. FIG. 4a indicates the engagement characteristic for a clutch 48', which may correspond to the clutch 48 of FIG. 1. As in the case of FIG. 3, the clutch 48' communicates with an accumulator 244. The accumulator chamber communicates with the clutch pressure chamber through passage 246. Unlike the accumulator in FIG. 3, a line pressure modulator valve 248 is used to regulate the pressure in the spring chamber of the accumulator 244.

Line pressure is varied as a function of engine torque. Thus, the engagement characteristic shown in FIG. 4a at 240' is characterized by a rising pressure at various pressure levels between maximum and minimum limits, as indicated at 250. The ultimate line pressure made available to the clutch 48' is as shown at 252. The variation in the level of the pressure during shifting of the clutch 48' is determined by the line pressure modulator valve 248, which typically would be under the control of the transmission microprocessor controller.

Figure 5:
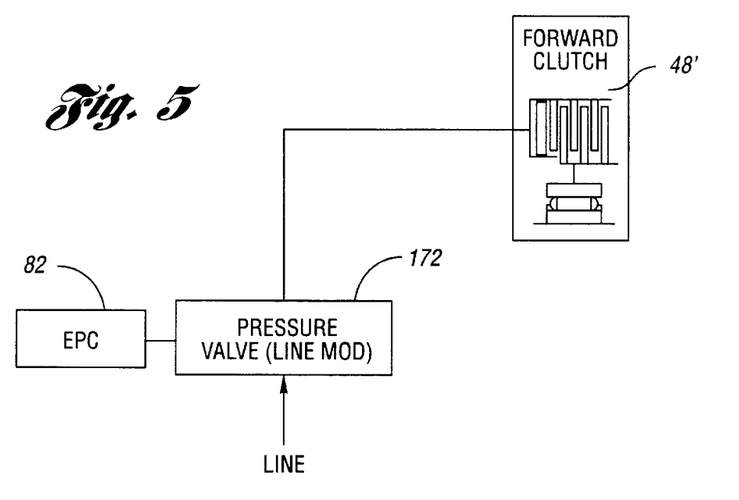
FIG. 5 is a schematic representation of the forward clutch controller for a transmission of the type shown in FIG. 1 when the transmission embodies the improved neutral idle feature of the invention.
Figure 5A:
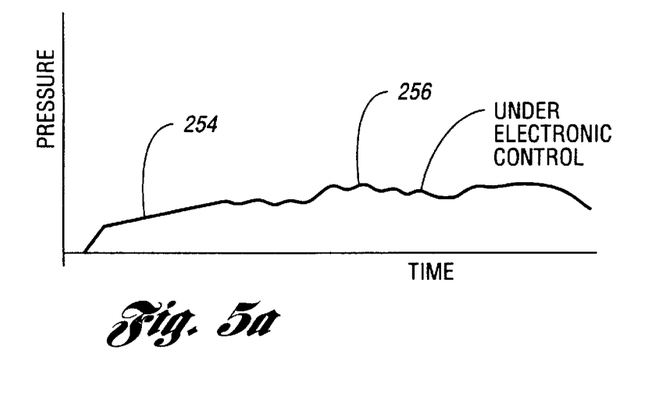
FIG. 5*a* is a plot of the pressure buildup in the clutch of FIG. 5 throughout the clutch engagement interval.

In contrast to the known clutch engagement patterns of FIGS. 3a and 4a, FIG. 5a shows a clutch engagement characteristic for a forward clutch that embodies the neutral idle feature of the invention. The schematic representation of the clutch circuit corresponding to the characteristic curve of FIG. 5a is shown in FIG. 5. Clutch pressure feed passage 202 is supplied by the line pressure modulator valve 172, which is under the control of the electronic microprocessor 82 and the electronic pressure control variable-force solenoid, as described previously.

In FIG. 5a, the stroking of the piston for the forward clutch 38 results in a pressure buildup with normal slope as shown at 254. After the piston is fully stroked, the pressure versus engagement time characteristic for the clutch 38 is represented by the plot 256. The shape of the plot 256 is determined by the calibration of the microprocessor controller 82. It is a function of the several variables previously described, which are inputs for the microprocessor controller.

A neutral idle state, which corresponds to the characteristic curve shown in FIG. 5a, requires the clutch to be slipped to emulate a neutral condition. The clutch, however, must be fully stroked at that time in order to provide an immediate torque delivery when the operator demands acceleration torque. A conventional transmission having an engagement clutch of the kind described in FIG. 3a, for example, would not have the capability of providing a neutral idle because the friction elements would be engaged with line pressure rather than a modulated pressure as described with reference to FIG. 5. The minimum line pressure in the case of a conventional transmission would be about 50 psi.

The neutral idle feature of the invention is achieved merely by the addition of a single valve, which is the engagement valve 148. The addition of the single valve to achieve the additional neutral idle function is made possible because of the multiplexing feature of the bypass clutch solenoid 104. Thus, the bypass clutch solenoid 104 can provide control of the engagement valve when neutral idle is desired, but it is capable also of providing its usual function as it controls the converter bypass valve 206. Furthermore, there is no requirement for the control valve circuit of the present invention to provide accumulators of the kind shown, for example, in FIGS. 3 and 4. Thus, the overall control valve circuit is simplified compared to a valve circuit of the kind shown, for example, in U.S. Pat. No. 5,389,046.

As previously indicated, the engagement valve 148 is a two-state valve. Its position is controlled by the bypass clutch solenoid 104. When the manual valve is in its drive range position and the bypass solenoid valve is "OFF" with zero pressure, the engagement valve is in the right-hand position. Line pressure from passage 162 then will be fed directly to the forward clutch. When the bypass clutch solenoid valve 104 is "ON", passage 154 is pressurized, thereby shifting the engagement valve 148 to its left-hand position. The clutch 38 then will be fed with modulated line pressure in passage 158. The modulated line pressure is developed by the line pressure modulator valve 172, as previously explained.

In neutral and reverse positions for the manual valve, both modulated line pressure in passage 158 and line pressure in passage 162 are vented through the manual valve. During operation in the second, third and fourth ratios, when the manual valve is in the D position, the engagement valve will be locked in its right-hand position by pressure in passage 244. Passage 244 communicates with line pressure passage 140 through the 1-2 shift valve. The bypass clutch then can be operated normally as bypass clutch pressure 106 from the bypass clutch solenoid will operate the bypass clutch and bypass clutch pressure will have no effect on the engagement valve. In first ratio operation with the manual valve in the D position, the bypass valve 206 is locked into the off position by pressure in passage 216, which prevents the bypass clutch from being applied when the neutral idle state is commanded.

In reverse drive, the reverse pressure in passage 186 is fed through the 1-2 shift valve to both passage 188 leading to the reverse clutch and to passage 122 leading to the low-and-reverse valve 114. The shift valve at that time is in its left-hand position. When the engagement valve is in its neutral idle position, the reverse clutch pressure in passage 164 is blocked by valve land 160, and passage 166 is vented. The low-and-reverse valve, when the passage 166 is vented, will regulate the low-and-reverse clutch pressure so that it is a function of throttle valve pressure. Therefore, the lowand-reverse clutch pressure at that time is controlled by the transmission microprocessor controller 82.

When the engagement valve is in the normal operating position, the pressure in passage 166 is reverse clutch pressure, which causes the low-and-reverse valve to saturate. Low-and-reverse pressure then will go to full reverse clutch pressure independently of throttle valve pressure in passage 90. In reverse, the bypass valve is locked in its "OFF" position by reverse line pressure. To establish a reverse inhibitor feature, a shift control solenoid (not shown) will pressurize the left side of the 1-2 shift valve. This causes the 1-2 shift valve to be moved to the right-hand position shown in FIG. 2. Reverse pressure in passage 186 from the manual valve is blocked at the 1-2 shift valve, and reverse clutch pressure is vented through passage 188 and through a vent port 190 in the 1-2 shift valve. Simultaneously, pressure at low-and-reverse clutch 44 is vented through the vent port 168.

Although a preferred embodiment of the invention has been disclosed, it will be apparent to persons skilled in the art that modifications to the invention may be made without departing from the scope of the invention. All such modifications and equivalents thereof are intended to be covered by the following claims.

What is claimed is:

1. A control valve circuit for an automatic transmission in an automotive vehicle driveline having an engine and traction wheels;

multiple-ratio gearing having a torque output shaft connected drivably to the traction wheels;

a hydrokinetic unit having an impeller connected to the engine and a turbine connected to a torque input element of the gearing;

clutch and brake means for establishing and disestablishing multiple torque flow paths through the gearing including a forward drive clutch selectively connecting the turbine to the torque input element of the gearing;

a selectively engageable bypass clutch in the hydrokinetic unit connecting the turbine to the torque input element of the gearing when it is engaged;

a main pressure regulator valve means for supplying an engaging hydraulic line pressure to the valve circuit, a line pressure modulator valve in the valve circuit for modulating the line pressure;

an engagement valve means in the circuit between the line pressure modulator valve and the forward drive clutch for distributing modulated line pressure to the forward drive clutch when it assumes a first position and for distributing regulated line pressure to the forward drive clutch when it assumes a second position;

a bypass clutch control valve means in the valve circuit for distributing actuating pressure to the bypass clutch;

a bypass clutch solenoid valve means for developing a pressure signal that activates the engagement valve means to effect modulated line pressure distribution to the forward drive clutch when the engagement valve is in its second position; and an electronic pressure control valve means responsive to driveline operating variables for developing a torque sensitive pressure signal, the line pressure modulator valve means responding to the torque sensitive signal to effect a modulated line pressure that results in slipping engagement of the forward drive clutch when the transmission is operating in a low speed ratio with the engine idling.

2. The control valve circuit set forth in claim 1 wherein the bypass clutch control valve means communicates with the bypass clutch solenoid valve means when the transmission is operating in a speed ratio that is higher than the low speed ratio whereby the bypass clutch is actuated with regulated line pressure; and shift valve means for distributing regulated line pressure to the engagement valve to shift the engagement valve to the first position when the transmission is operating in a speed ratio that is higher than the low speed ratio.

3. The control valve circuit set forth in claim 2 wherein the engagement valve is shiftable to its first position by a valve spring and is shiftable to its second position by a pressure signal developed by the bypass clutch solenoid valve means.

4. The control valve circuit set forth in claim 1 wherein the engagement valve is shiftable to its first position by a valve spring and is shiftable to its second position by a pressure signal developed by the bypass clutch solenoid valve means.

5. A control valve circuit for an automatic transmission in an automotive vehicle driveline having an engine and traction wheels;

multiple-ratio gearing having a torque output shaft connected drivably to the traction wheels;

a hydrokinetic unit having an impeller connected to the engine and a turbine connected to a torque input element of the gearing;

clutch and brake means for establishing and disestablishing multiple torque flow paths through the gearing including a forward drive clutch selectively connecting the turbine to the torque input element of the gearing;

a selectively engageable bypass clutch in the hydrokinetic unit connecting the turbine to the torque input element of the gearing when it is engaged;

a main pressure regulator valve means for supplying an engaging hydraulic line pressure to the valve circuit, a line pressure modulator valve in the valve circuit for modulating the line pressure;

an engagement valve means in the circuit between the line pressure modulator valve and the forward drive clutch for distributing modulated line pressure to the forward drive clutch when it assumes a first position and for distributing regulated line pressure to the forward drive clutch when it assumes a second position;

a bypass clutch control valve means in the valve circuit for distributing actuating pressure to the bypass clutch;

a bypass clutch solenoid valve means for developing a pressure signal that activates the engagement valve means to effect modulated line pressure distribution to the forward drive clutch when the engagement valve is in its second position;

an electronic pressure control valve means responsive to driveline operating variables for developing a torque sensitive pressure signal, the line pressure modulator valve means responding to the torque sensitive signal to effect a modulated line pressure that results in slipping engagement of the forward drive clutch when the transmission is operating in a low speed ratio with the engine idling;

the clutch and brake means including a reverse drive clutch, a low-and-reverse regulator valve means in the control valve circuit for modulating line pressure to effect a modulated reverse clutch pressure in the reverse drive clutch;

the engagement valve providing fluid pressure communication therethrough from the low-and-reverse regulator valve means to the reverse clutch when the engagement valve is in its first position.

6. The control valve circuit set forth in claim 5 wherein the bypass clutch control valve means communicates with the bypass clutch solenoid valve means when the transmission is operating in a speed ratio that is higher than the low speed ratio whereby the bypass clutch is actuated with regulated line pressure; and shift valve means for distributing regulated line pressure to the engagement valve to shift the engagement valve to the first position when the transmission is operating in a speed ratio that is higher than the low speed ratio.

7. The control valve circuit as set forth in claim 5 wherein the engagement valve is shiftable to its first position by a valve spring and is shiftable to its second position by the pressure signal developed by the bypass clutch solenoid valve means.

8. The control valve circuit as set forth in claim 5 wherein the torque sensitive pressure signal acts on the low and reverse regulator valve means to establish a modulated low-and-reverse clutch pressure that effects slipping engagement of the low-and-reverse drive clutch.

* * * * *